April 10, 1945.                L. P. SHARPLES                2,373,350
                        PURIFICATION OF AVIATION OIL
                           Filed Sept. 17, 1942
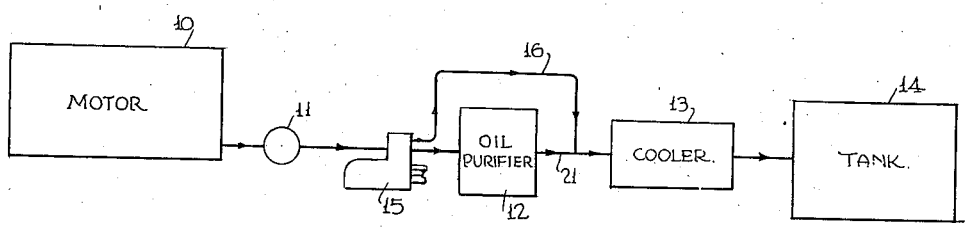
FIG. 1
FIG. 2
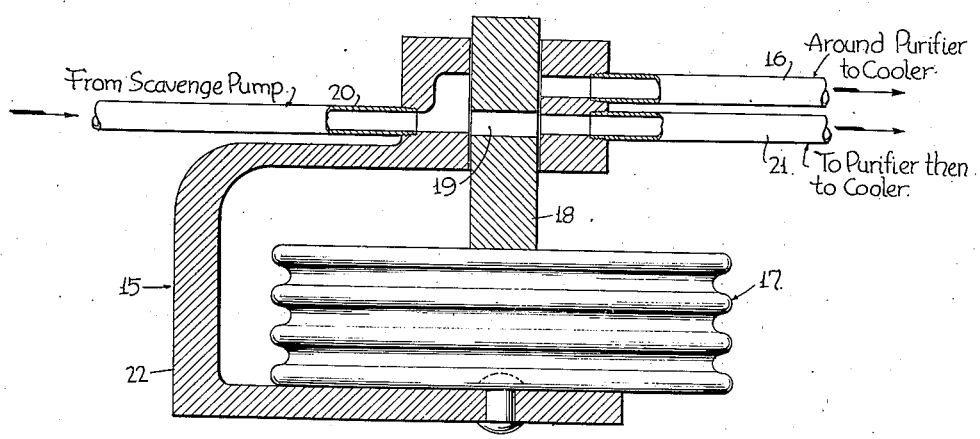
INVENTOR
Laurence P. Sharples.
BY Maurice A. Crew
ATTORNEY Patented Apr. 10, 1945

2,373,350

UNITED STATES PATENT OFFICE 2,373,350

PURIFICATION OF AVIATION OIL

Laurence Price Sharples, Ardmore, Pa., assignor to The Sharples Corporation, Philadelphia, Pa., a corporation of Delaware Application September 17, 1942, Serial No. 458,624

6 Claims. (Cl. 210—62)

The present invention pertains to the treatment of lubricating oils to reclaim them for reuse. It is concerned particularly with the cooling and purification of oil used to lubricate a vehicle motor, such as an aircraft motor. The detailed features of the invention will be discussed in their relation to the purification and cooling of aviation engine oil after use in an airplane motor, as treating steps applied to that oil prior to return thereof to the motor for reuse.

The lubricating system of an airplane engine may comprise an oil storage tank, a conduit from the storage tank to a feed pump on or in the engine which pumps oil to various parts of the engine to lubricate it, a sump in the engine into which the oil drains from the various parts of the engine, a scavenge pump which pumps oil and some air from the sump, a conduit from the scavenge pump to an oil cooler, an oil cooler and a conduit back to the oil storage tank.

The present invention is concerned with the provision of an oil purifier, such as a centrifugal separator or a filter, in the line of flow of oil from the scavenge pump, under the impelling energy of that pump. The provision of an oil purifier in this line increases the amount of pressure which must be developed by the scavenge pump, since it involves interposition of an additional element of flow resistance in this part of the system. The scavenge pump at sea level or low altitude has considerably greater pumping capacity than that which would be required to pump all of the oil from the sump at sea level, this excess capacity being necessary so that there will be sufficient capacity available at the ceiling altitude, since the capacity of the pump decreases as the airplane ascends. If this engineering precaution were not taken, the scavenge pump would have insufficient capacity to remove oil from the sump as fast as oil enters the sump at high altitudes, with the result that oil and foam would overflow from the engine breather, and the oil supply tank would empty, and that the plane would be compelled to descend. The provision of an oil purifier in the scavenge line would ordinarily increase the magnitude of this problem, since the flow resistance interposed in the scavenge line by this additional element would reduce the capacity of the scavenge pump for performing its scavenging function. The objection to the installation of a purifier has been so great because of the above considerations as to cause those skilled in the art to question the advisability of use of such a purifier, in spite of the obvious advantages obtainable by purifying the oil. Ability to scavenge the oil properly at high altitudes is ordinarily considered so important that scavenging must not be endangered by purifying.

The present invention provides an arrangement by which the advantages of the use of an oil purifier in such a system may be attained in the absence of the disadvantages. It involves a system and method of operation by which the oil is passed through the purifier only at such times in the operation of the motor as the ambient atmospheric pressure may be above a predetermined minimum. Thus when the airplane is flown above a certain predetermined maximum altitude, the oil purifier will be by-passed, with the result that its effect as a flow resistant element will be eliminated.

In operation of airplanes from dusty fields, considerable amounts of abrasive material enter the engine, particularly through the carburetor air intake, and pollute the lubricating oil. This pollution occurs almost entirely while the airplane is on the ground, taking off, landing, or at low altitude. At high altitude, the air is usually devoid of abrasives. Hence oil purification is in general more important at low altitude than at high altitude. The present invention takes advantage of the peculiar circumstance that oil purification is needed at a time when the additional flow resistance interposed by the purifying element will not lower the capacity of the scavenge pump too seriously, and that such purification is not so necessary at times when this flow resistance would seriously impair the scavenge function; i. e., at high altitudes.

The manner in which this type of operation is effected will be evident from consideration of the attached drawing in the light of the following detailed description.

In the drawing,

Figure 1 is a flow sheet illustrating the principle of operation of the invention and elements involved in practice thereof, and Figure 2 is a cross-section, illustrating the by-pass valve 15 used in practice of the invention.

Referring to the drawing by reference characters, oil from the motor 10 is removed by scavenge pump 11, together with a substantial quantity of gas, as will be understood by those skilled in the art. When flying at low altitude, this oil is impelled by scavenge pump 11 through valve 15 to an oil purifier 12, which may be a centrifugal separator, filter, or other suitable type of oil purifier. From the oil purifier, the oil flows through cooler 13 to storage tank 14, whence it may be recycled to the motor by the conventional feed pump of the airplane lubrication system.

When the airplane is operating above a certain predetermined altitude, however, the valve 15 will have been actuated into position to cause the oil to pass through the conduit 16 to the oil cooler 13, without passing through the purifier 12. By operating in this manner, the flow resistance of the purifier 12 will be eliminated at high altitudes, with the result that the scavenge pump will be better able to perform its function of feeding the oil through the cooler 13 to the tank 14 in spite of the increased difficulties of such feed interposed by high altitude flight.

Similar equipment similarly connected-up can be used on the coolant system for liquid-cooled aviation engines, in which case the purifier may be used principally for the removal of entrained air from the coolant. The system can be used also on motorized vehicles travelling up and down mountains. The system can also be used in cases in which there is no cooler in the system, for the purpose of by-passing the purifier at high altitudes.

The valve 15 may comprise a bracket 22, on the base of which a flexible bellows 17 is secured. A piston 18 is attached to one side of this bellows, and this piston contains a port 19 adapted to direct liquid alternatively into conduit 21 or conduit 16, depending upon the position of the port 19. Liquid received from the scavenge pump through conduit 20 is directed through port 19 to conduit 21 so long as the bellows 17 is compressed by the ambient pressure to an extent sufficient to maintain the parts in position illustrated in Figure 2 of the drawing. When the ambient pressure falls below a certain predetermined value, due to altitude, the bellows 17 will expand, due to pressure of gas sealed therein, with the result that the piston 18 will be forced upwardly, causing the liquid to be by-passed through conduit 21 around the purifier to the cooler.

Various modifications are available to those skilled in the art, and I do not accordingly wish to be limited except by the scope of the following claims.

I claim:

1. In a liquid purifying system for ascending equipment designed to ascend and descend with said equipment, the combination comprising a conduit through which liquid flows, a liquid purifier connected with said conduit for treating liquid passing through said conduit, a by-pass line leading from said conduit around said purifier and back to said conduit, a pump in said conduit for impelling liquid through said conduit toward said purifier and toward said by-pass line, and means associated with said conduit for selectively directing the flow of liquid either through said purifier or through said by-pass line to by-pass said purifier, said means being responsive to atmospheric pressure at relatively high altitudes of use of said equipment to by-pass said purifier when that pressure is below a predetermined value due to the high altitude of said equipment.

2. In an oil purifying system for aircraft and designed to ascend and descend with said aircraft, the combination comprising a cooler, a conduit through which oil flows in transit to said cooler, an oil purifier connected with said conduit for treating oil passing through said conduit is transit to said cooler, a by-pass line leading from said conduit around said purifier and to the receiving side of said cooler, an impeller in said conduit for impelling oil through said conduit toward said purifier and toward said by-pass line, and means associated with said conduit for selectively directing the flow of oil either through said purifier or through said by-pass line to said cooler, said means being responsive to atmospheric pressure at relatively high altitudes of use of said aircraft to by-pass said purifier when that pressure is below a predetermined value due to the high altitude at which said aircraft is flying.

3. In a liquid purifying system for ascending equipment designed to ascend and descend with said equipment, the combination comprising a conduit through which liquid flows, a liquid purifier connected with said conduit for treating liquid passing through said conduit, a by-pass line leading from said conduit around said purifier and back to said conduit, a pump in said conduit for impelling liquid through said conduit toward said purifier and toward said by-pass line, a valve associated with said conduit and directing flow of liquid to said purifier and to said by-pass line, and means for actuating said valve and thereby selectively controlling the flow of liquid either through said purifier or through said by-pass line, said means being responsive to atmospheric pressure at relatively high altitudes of use of said equipment to by-pass said purifier when that pressure is below a predetermined value due to the high altitude of said equipment.

4. In an oil purifying system for aircraft and designed to ascend and descend with said aircraft, the combination comprising an engine, an oil cooler, a conduit connecting said engine and said cooler through which oil flows in transit to said cooler, an oil purifier connected with said conduit for treating oil passing through said conduit in transit to said cooler, a by-pass line leading from said conduit around said purifier and to the receiving side of said cooler, a scavenge pump in said conduit for impelling oil from said engine through said conduit toward said purifier and toward said by-pass line and adapted to impel large quantities of air with said oil, and means associated with said conduit for selectively controlling the flow of oil with entrained air either through said purifier or through said by-pass line to said cooler, said means being responsive to atmospheric pressure at relatively high altitudes of use of said aircraft to by-pass said purifier when that pressure is below a predetermined value due to the high altitude at which said aircraft is flying.

5. In an oil purifying system for aircraft and designed to ascend and descend with said aircraft, the combination comprising an engine, an oil cooler, a conduit connecting said engine and said cooler through which oil flows in transit to said cooler, an oil purifier connected with said conduit for treating oil passing through said conduit in transit to said cooler, a by-pass line leading from said conduit around said purifier and to the receiving side of said cooler, a scavenge pump in said conduit for impelling oil from said engine through said conduit toward said purifier and toward said by-pass line, a valve associated with said conduit and directing flow of liquid to said purifier and to said by-pass line, and means for actuating said valve and thereby selectively controlling the flow of oil either through said purifier or through said by-pass line to said cooler, said means being responsive to atmospheric pressure at relatively high altitudes of use of said aircraft to by-pass said purifier when that pressure is below a predetermined value due to the high altitude at which said aircraft is flying.

6. A liquid purifying system for ascending equipment designed to ascend and descend with said equipment, comprising in interconnected relation a pump, a liquid purifier for treating liquid passing through the system, a by-pass line leading from the system around said purifier and back to the system, said pump impelling liquid through the system and toward said by-pass line, and means associated with said system for selectively directing the flow of liquid either through said purifier or through said by-pass line to by-pass said purifier, said means being responsive to atmospheric pressure at relatively high altitudes of use of said equipment to by-pass said purifier when that pressure is below a predetermined value due to the high altitude of said equipment.

LAURENCE PRICE SHARPLES.